United States Patent [19]

Jacks

[11] 4,026,595

[45] May 31, 1977

[54] AIR CURRENT DEFLECTOR FOR A TOWED TRAILER

[76] Inventor: George J. Jacks, 342 Wrights Lane, Exton, Pa. 19341

[22] Filed: Mar. 24, 1976

[21] Appl. No.: 670,511

[52] U.S. Cl. ................................ 296/1 S; 40/129 C

[51] Int. Cl.² ........................................ B62D 37/02

[58] Field of Search ................. 296/1 S, 91, 96, 86, 296/92, 137 J; 40/129 C

[56] References Cited

UNITED STATES PATENTS

| | | | |
|---|---|---|---|
| 1,177,626 | 4/1916 | Huff | 296/86 |
| 2,236,846 | 4/1941 | Davisson | 296/91 |
| 3,596,974 | 8/1971 | Adams | 296/91 |
| 3,904,236 | 9/1975 | Johnson | 296/91 |

*Primary Examiner*—Richard J. Johnson
*Attorney, Agent, or Firm*—Robert K. Rhea

[57] ABSTRACT

An elongated generally rectangular panel is pivotally secured to vehicle connected roof support members transversely of the vehicle. The length of the panel is substantially equal to the width of the roof and, when in operative position, is disposed with a depending edge disposed below and forwardly of its opposite trailing edge to define an upwardly and rearwardly inclined face portion for deflecting air currents passing over the vehicle roof, upwardly and rearwardly above the forward end of a trailer towed by the vehicle.

4 Claims, 3 Drawing Figures

AIR CURRENT DEFLECTOR FOR A TOWED TRAILER

BACKGROUND OF THE INVENTION

1. Field of the Invention

The present invention relates to an air current deflector to be mounted on the roof of a towing vehicle for reducing the drag resulting from air currents against the forward surfaces of a trailer.

When a towing vehicle, such as an automobile, traveling at or near the maximum speed limit on a highway and pulling a trailer, such as a travel trailer, air currents or high wind resistance known as "wind drag" is imposed on both vehicles as a result of their velocity. This wind drag varies according to wind direction and is increased to some extent by air currents moving over the towing vehicle's upper surfaces which are normally disposed at a lower level than the upper limits of the travel trailer. In addition to sometimes inducing swaying action and wind induced vibrations on the travel trailer, the wind drag increases the wear on the towing vehicle transmission and decreases the miles per gallon of fuel consumed.

This invention achieves a reduction of wind drag forces as applied to a trailer and hence a reduction in the quantity of fuel which would otherwise be burned by the towing vehicle.

2. Description of the Prior Art

The prior art discloses it is old to mount an air current deflector on the roof of a towing vehicle to reduce the drag of a trailer but previous deflectors have not generally been acceptable and used possibly for the reason of the initial expense, such as the requirement for specialized mounting means or the complexity of the devices or they were not adjustable and were inefficient due to misplacement in mounting.

This invention provides an air current deflecting panel which may be connected with substantially any type towing vehicle having a roof over the driver's position and which is easily adjusted to obtain its maximum benefits.

SUMMARY OF THE INVENTION

A pair of substantially conventional roof top carrier rails are transversely secured to the drip rails of a towing vehicle roof and extend transversely of the roof in parallel spaced-apart relation. An elongated generally rectangular panel is pivotally connected, by one longitudinal edge, with a first set or plurality of clamp members releasably engageable with the forwardmost roof top carrier rail. A pair of locking bars are pivotally connected at one end with a second set or pair of the clamp means in turn gripping the rearwardmost roof mounting rail and are adjustably connected with the upwardly disposed edge portion of the panel to selectively dispose the panel in an upwardly and rearwardly inclined plane and lock the panel in the selected position. The lock bars also permit the panel to be flatly disposed horizontally above the towing vehicle roof when not needed as a trailer wind deflector.

The principal object of this invention is to provide a simply constructed, easily installed, adjusted and removed economical trailer wind drag deflector which may be disposed for deflecting wind currents upwardly and above the direction of travel of the towing and towed vehicles.

DESCRIPTION OF THE PREFERRED EMBODIMENT

Figure 1:
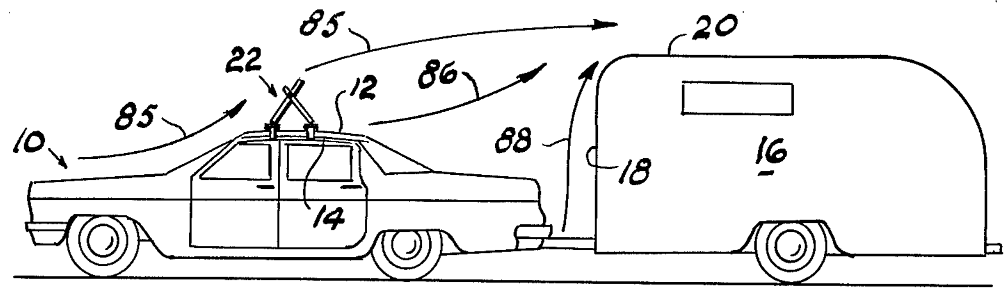
FIG. 1 is a side elevational view of a travel trailer towed by an automobile having the deflector installed thereon with arrows indicating the direction of air flow.
Figure 2:
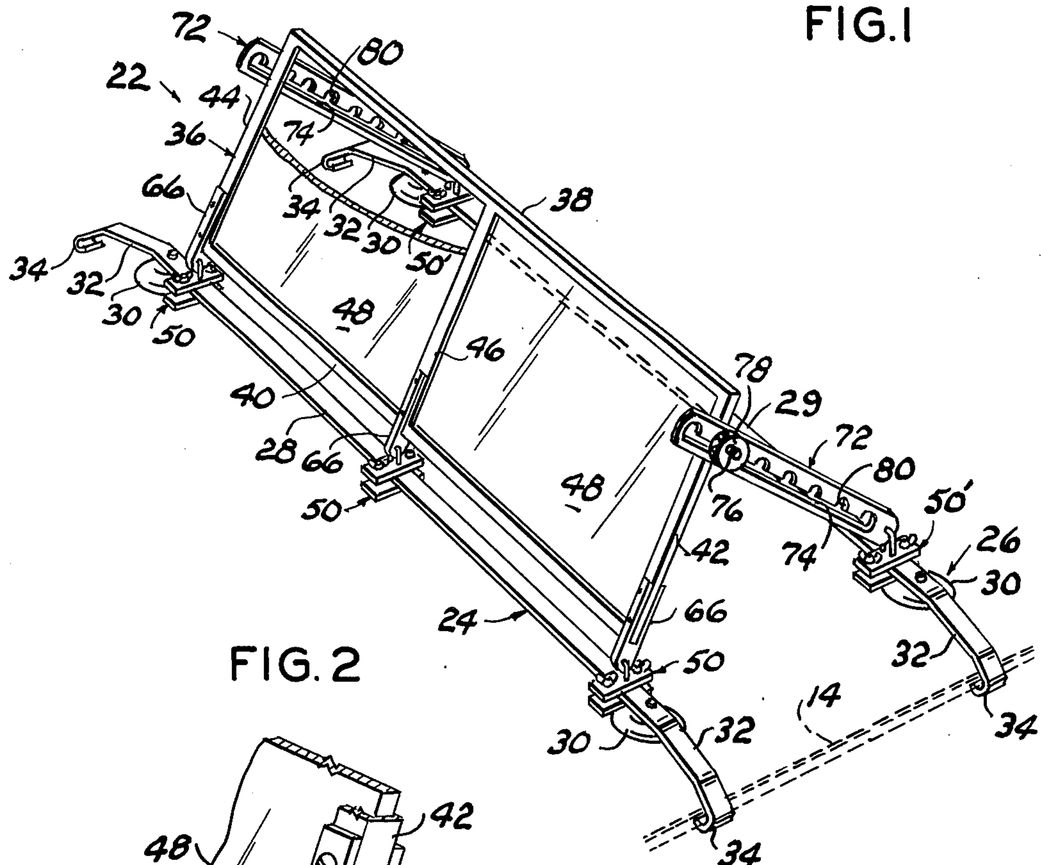
FIG. 2 is a perspective view of the wind deflector and roof mounting rails, per se, with parts broken away for clarity; and, FIG. 3 is a fragmentary perspective view, to a larger scale, illustrating the manner in which the panel is connected to one of the clamp members gripping a fragment of one roof carrier rail.
Figure 3:
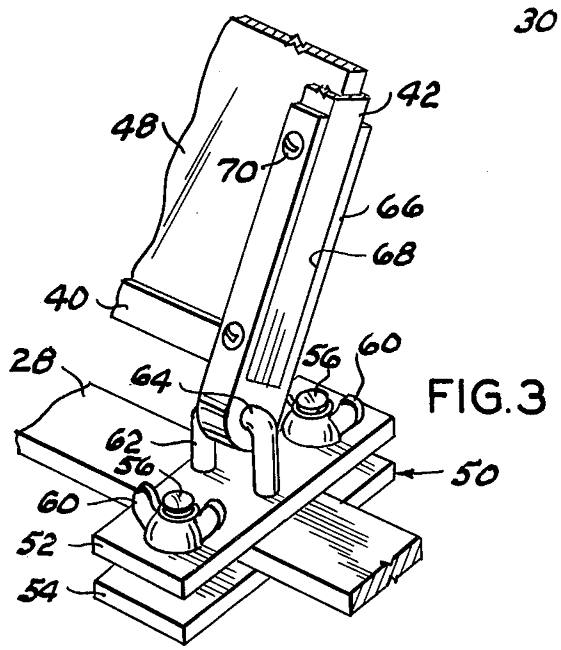

Like characters of reference designate like parts in those figures of the drawings in which they occur.

In the drawings:

The reference numeral 10 indicates a passenger vehicle having a roof 12 provided at its opposite sides with rain gutters or drip rails 14.

The numeral 16 indicates a travel trailer, or the like, towed by the towing vehicle 10 and having a forward surface 18 and a top 20.

The numeral 22 indicates the wind deflector, as a whole, which is supported on the vehicle roof 12 by car top carrier rails 24 and 26. The car top carrier rails 24 and 26 are identical and conventional and are sometimes referred to as a "roof rack" which is mounted on the roof of the vehicle, such as an automobile, for transporting luggage, camping equipment, or the like. The carriers 24 and 26 usually comprise elongated bar-like members 28 and 29 supported at their respective ends in spaced relation above the upper surface of the vehicle roof 12 by suction cups 30. The suction cups 30 normally secure the roof rack rails 28 and 29 to the vehicle roof but as a safety feature the roof rack is anchored to the vehicle by extensions or strap members 32, each terminating in a hook-shaped end member 34 which grips the drip rail 14 at respective opposing sides of the roof 12. The strap extensions 32 are usually flexible fabric material and are preferably provided with adjustable means, such as buckles, or the like, not shown, to compensate for the spacing between vehicle drip rails and to apply tension to the roof rack rails 28 and 29.

The deflector means 22 comprises a generally rectangular panel 36, having a length substantially equal to the roof width, formed by a frame composed of upper and lower longitudinal members 38 and 40, respectively, joined at their respective ends by frame end members 42 and 44. In the example shown, the frame 36 is transversely divided medially its ends by a frame center member or cross bar 46 to form a pair of frame openings which are preferably closed by transparent material panels, such as plexiglass 48.

A plurality of forward or first clamp means 50 secure the panel 36 to the forward roof rail 28. Each of the clamp means 50 comprise upper and lower clamp strips 52 and 54, respectively, over and underlying the upper end depending surfaces of the forward roof rack rail 28 and are secured thereto in clamping relation by stud bolts 56 secured to the depending clamp strip 54 which project through aligned apertures formed in the top clamp strip 52 and engaged by wing nuts 60, or the like. The top clamp strip 52 is provided with an inverted U-shaped loop having legs 62 and a bight portion 64 disposed horizontally to form a pivot axis. One end of an upstanding panel mounting bar 66 is pivotally connected with the bight portion 64. The bar 66 has an elongated slot 68 in its other end portion cooperatively receiving a depending edge portion of the respective frame end and medial member and is rigidly secured to the frame by screws 70, or the like.

A pair of strap-like locking bars 72 secure the other longitudinal edge portion of the panel 36 to the rearward roof rail 29. Each of the locking bars are pivotally connected at one end portion to second or rearward identical clamp means 50' which in turn grip the rearward roof rack rail 29. Each of the locking bars are vertically disposed edgewise strap-like in overall configuration and are provided with an elongated slot 74 adjacent one longitudinal edge which slidably receives a threaded pin 76 horizontally secured to the respective frame end 42 and 44 and having a knurled nut-like knob 78 threadedly engaged therewith. Each locking bar 72 is further provided with a plurality of longitudinally spaced notches or recesses 80 in its other longitudinal edge portion which open toward the elongated slot 74 and nests the locking pin 76 in a selected location and angular position of the panel 36 with respect to the vehicle roof top and direction of travel.

OPERATION

In operation, the roof racks 24 and 26 and deflector 22 are assembled and mounted on the roof 12, as described hereinabove.

The plane of the panel 36 is adjusted by the locking bars 72 to dispose the plane of the panel in an upwardly and rearwardly inclined position in accordance with the spacing between the location of the panel on the vehicle and the forward surface 18 of the travel trailer 16 and the plane of the travel trailer top 20 above the upper limit of the vehicle 10. Forward motion of the vehicles then deflect air currents passing over the forward portion of the vehicle 10 in an upward and rearward direction, as indicated by the arrows 85, so that the principal path of air current or stream is above the plane of the travel trailer top 20. Some of the air currents passing over the upper surfaces of the vehicle 12 pass under the panel 36 by reason of the spacing of the roof rack rails 28 and 29 above the upper limit of the roof 12 and the spacing of the depending edge surface of the panel frame member 40 above the plane of the roof rack rails so that a current of air, indicated by the arrow 86, flows rearwardly of the roof top 12 and is deflected upwardly over the travel trailer top 20. This eliminates a void or pressure reduction rearwardly of the panel 36 as a result of forward movement of the vehicles which induce the air currents passing under the towing vehicle 10 to be drawn upwardly, in the direction of the arrow 88, rearwardly of the towing vehicle and adjacent the forward surface 18 of the travel trailer.

When the towing vehicle is temporarily not attached to a trailer, the panel 36 may be flatly disposed in a horizontal plane by loosening the knurled knobs 78 to allow the rearward edge portion of the panel 36 to be pivoted toward the roof and held in such position by retightening the knurled knobs 78. The panel 36 then offers a minimum of resistance to the air when the vehicle 10 is in use and not towing a trailer.

Obviously the invention is susceptible to changes or alterations without defeating its practicability. Therefore, I do not wish to be confined to the preferred embodiment shown in the drawings and described herein.

I claim:

1. In combination with a vehicle towing a trailer, said vehicle having a roof and having a roof-top carrier means including forward and rearward generally horizontal rails extending transversely of said roof intermediate its length in parallel spaced relation, the improvement comprising:

an elongated panel means disposed above and transversely of said roof, said panel means having a face surface extending between a depending forwardly disposed leading edge and trailing edge disposed above and rearwardly of the leading edge so that the face surface deflects air currents passing over the roof in an upward direction;

first and second clamp means disposed near each end of said forward and rearward carrier rails, respectively, each clamp means including an upper and lower clamp strip transversely disposed respectively on the upper and lower surfaces of the respective carrier rail, bolts and thumb screws joining the respective adjacent ends of said clamp strips, a pivot axis forming horizontal member having legs secured to each respective said upper clamp strip; and, bar means pivotally connecting the leading and trailing edge portions of said panel means with the respective horizontal member on said clamp means.

2. The combination according to claim 1 in which said bar means includes:

a mounting bar having an elongated slot in its end portion opposite said horizontal member for nesting an intermediate portion of the leading edge of said panel means.

3. The combination according to claim 1 in which said bar means includes:

an elongated locking bar having an elongated slot adjacent one side in its end portion opposite said horizontal member and having a plurality of longitudinally spaced recesses in its opposite side edge portion open to the elongated slot; and, locking pin means including a knob connected with said panel means and releasably gripping said locking bar.

4. The combination according to claim 3 in which said panel means includes:

a generally rectangular frame; and, a panel disposed within said frame.

* * * * *